United States Patent
Hsu

[11] Patent Number: 5,293,786
[45] Date of Patent: Mar. 15, 1994

[54] KICKSTAND FOR BICYCLES

[76] Inventor: Jack Hsu, No. 16, Fu Kun Rd., Fu Hsiang, Changhwa Hsien, Taiwan

[21] Appl. No.: 14,567

[22] Filed: Feb. 8, 1993

[51] Int. Cl.⁵ .................................. B62H 1/00
[52] U.S. Cl. ........................... 74/564; 74/594.7; 280/293
[58] Field of Search .............. 74/594.7, 562, 564, 74/566; 280/293, 303, 295, 298, 300, 301

[56] References Cited

U.S. PATENT DOCUMENTS

| | | | |
|---|---|---|---|
| 518,325 | 4/1894 | Mueller | 280/293 X |
| 2,817,540 | 12/1957 | Pawsat | 280/293 |
| 3,642,305 | 2/1972 | Pawsat | 280/293 |
| 3,718,345 | 2/1973 | Bringman | 280/301 X |
| 4,779,886 | 10/1988 | Ehrlich | 280/303 X |
| 4,846,491 | 7/1989 | Caceres | 280/293 X |
| 5,064,213 | 11/1991 | Storch | 280/293 X |

FOREIGN PATENT DOCUMENTS

| | | | |
|---|---|---|---|
| 354793 | 12/1937 | Italy | 280/293 |
| 88541 | 2/1937 | Sweden | 280/293 |
| 228572 | 8/1943 | Switzerland | 280/293 |
| 20413 | of 1907 | United Kingdom | 280/293 |

Primary Examiner—Vinh T. Luong
Attorney, Agent, or Firm—Bacon & Thomas

[57] ABSTRACT

A kickstand for a bicycle includes a bracket, a slot formed in the bracket, a plate slidably engaged with the bracket, and a bolt engaged through the plate and the slot of the bracket so as to couple the plate to the bracket. The plate is adjustable relative to the bracket.

5 Claims, 4 Drawing Sheets

KICKSTAND FOR BICYCLES

BACKGROUND OF THE INVENTION

1. Field of the Invention

The present invention relates to a kickstand, and more particularly to a kickstand for bicycles.

2. Description of the Prior Art

Typical kickstands are solidly fixed to the rear wheel hub portion of the bicycle so as to support the bicycle in an erected position. However, the included angles between the chain stays and the seat stays of various kinds of bicycle are different from one another, such that a specific kickstand is required for each type of bicycle, the kickstands can not be fitted to the bicycles having different included angles between the chain stays and the seat stays.

The present invention has arisen to mitigate and/or obviate the afore-described disadvantages of the conventional kickstands.

SUMMARY OF THE INVENTION

The primary objective of the present invention is to provide a kickstand which is engageable to various kinds of bicycle frames.

In accordance with one aspect of the invention, there is provided a kickstand for a bicycle comprising a bracket including a slot formed therein, a plate slidably engaged with the bracket, and a bolt engaged through the plate and the slot of the bracket so as to couple the plate to the bracket, whereby, the plate is adjustable relative to the bracket.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
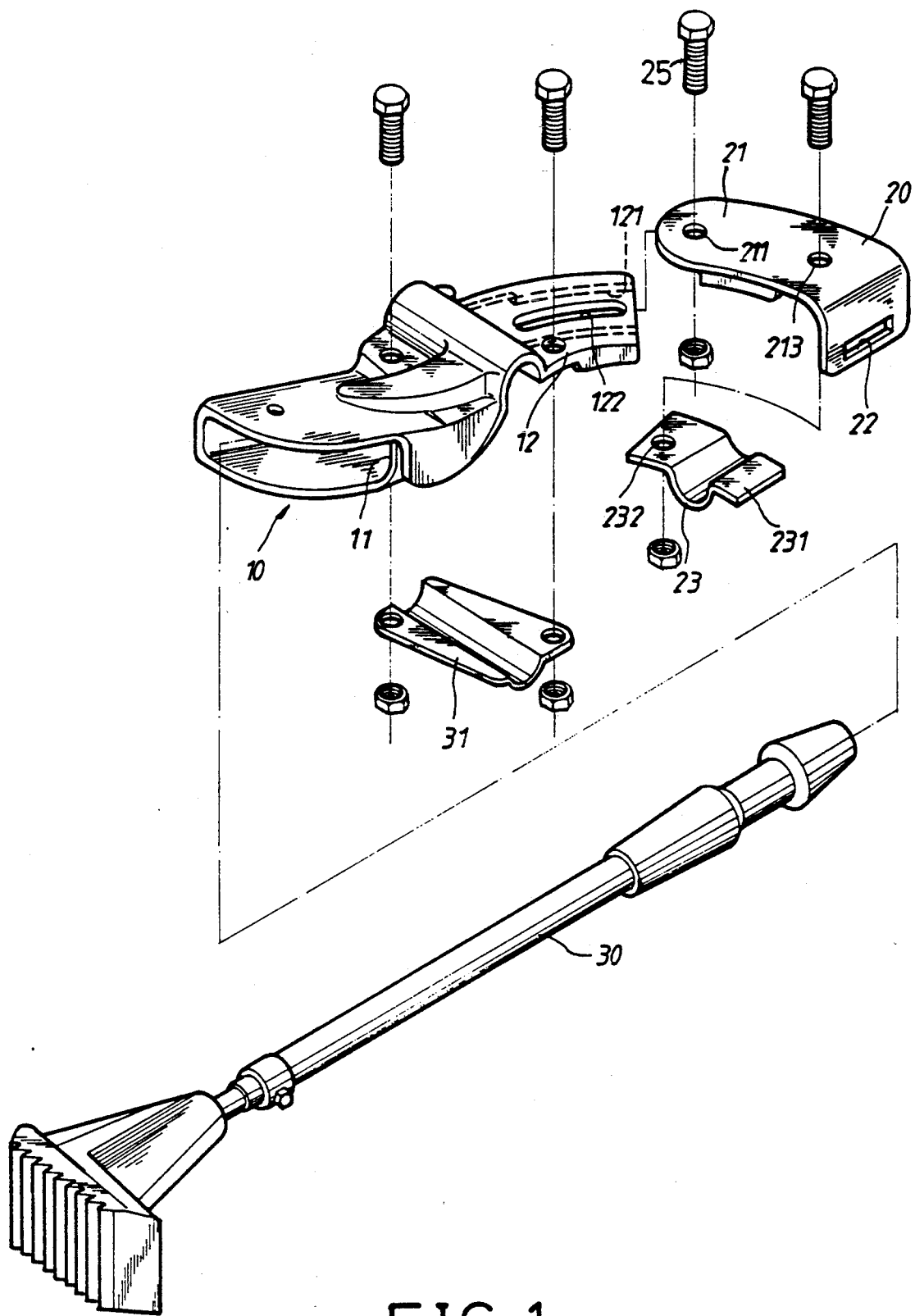
FIG. 1 is an exploded view of a kickstand in accordance with the present invention.
Figure 2:
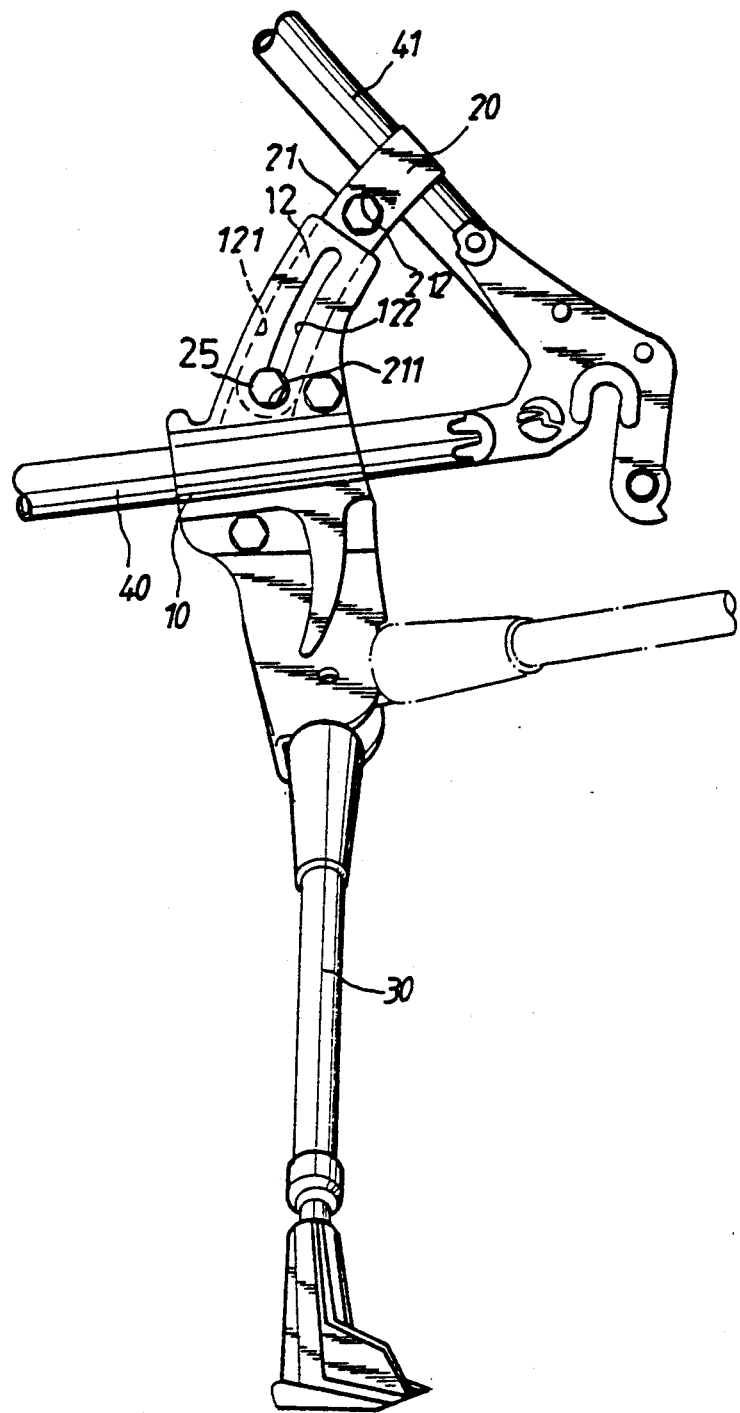
FIGS. 2 and 3 are side views of the kickstand.
Figure 4:
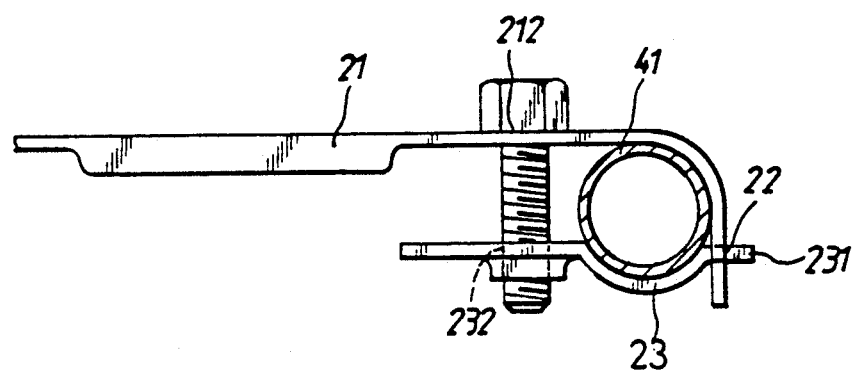
FIG. 4 is a partial cross sectional view illustrating the mounting of the kickstand.

Referring to the drawings, and initially to FIGS. 1, 2 and 4, a kickstand in accordance with the present invention comprises a bracket 10 and a plate 20 coupled together and engaged on the chain stay 40 and the seat stay 41 respectively, and a foot post 30 pivotally coupled in a space 11 which is formed in the bracket 10. A board 31 is secured to the bracket 10 for fixing the bracket 10 to the chain stay 40. The bracket 10 includes an extension 12 having a slot 122 formed therein and having a pair of ribs 121 oppositely formed thereon. The plate 20 includes a leg 21 slidably engaged between the ribs 121 of the bracket 10 and includes two holes 211, 213 and a panel-receiving slot 22 formed therein. A panel 23 includes one end 231 extended through the panel-receiving slot 22 of the plate 20 and includes an aperture 232 formed in the other end and aligned with the hole 213 of the plate 20 such that the plate 20 can be fixed to the seat stay 41. A bolt 25 is engaged through the hole 211 of the plate 20 and the slot 122 of the bracket 10 so as to fix the extension 12 of the bracket 10 and the leg 21 of the plate 20 together.

Figure 3:
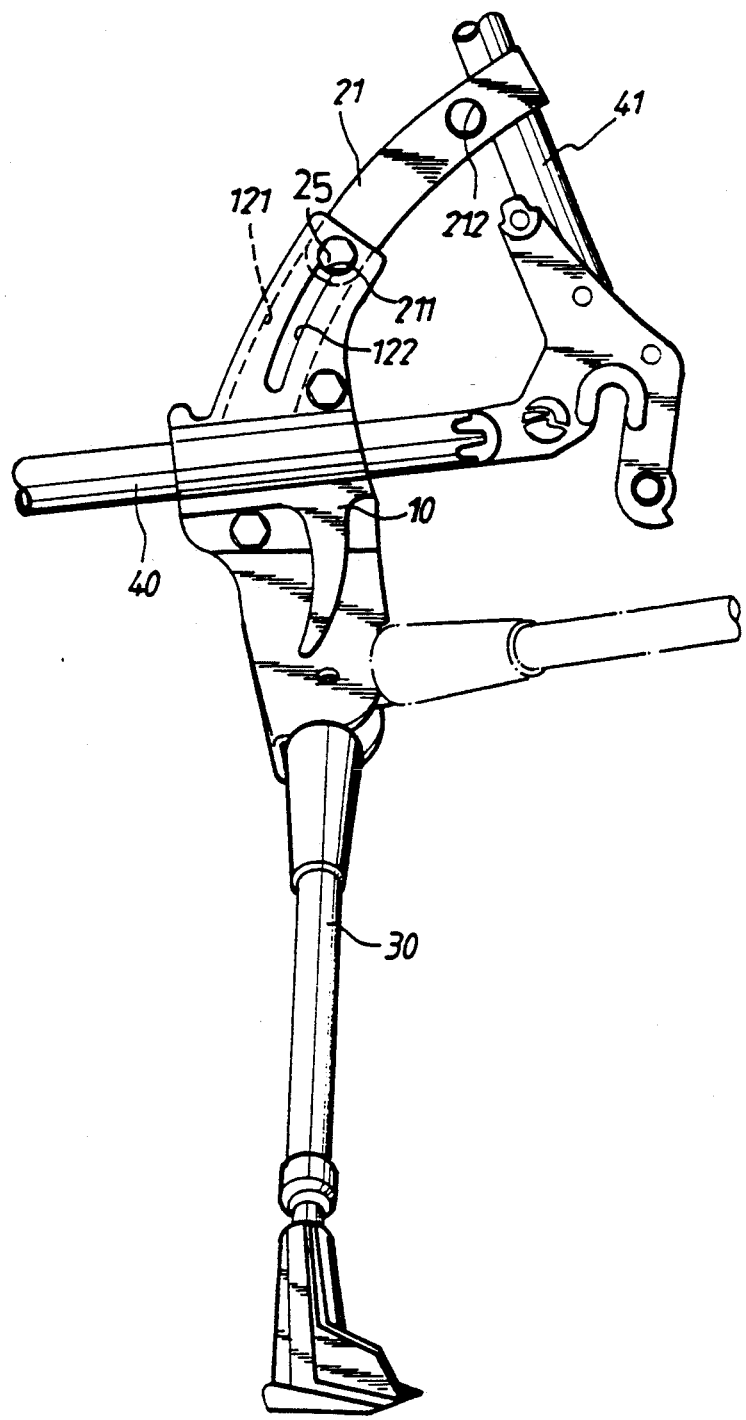

In operation, as shown in FIGS. 2 and 3, when the bicycle frame having various sizes, for example, when the included angles between the seat stays 41 and the chain stays 40 are different in various kinds of bicycles, the leg 21 of the plate 20 can be easily adjusted relative to the extension 12 of the bracket 10, such that the kickstand can be easily secured to various kinds of bicycle frame.

Accordingly, the kickstand in accordance with the present invention can be easily secured to various kinds of bicycle frame.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A kickstand for a bicycle, said kickstand comprising a bracket including a slot formed therein, a plate slidably engaged with said bracket, said plate including a panel-receiving slot formed therein, a panel having a first end extending through said panel-receiving slot of said plate and a second end fixed to said plate for securing said plate to a seat stay of a bicycle, and a bolt engaged through said plate and said slot of said bracket for coupling said plate to said bracket, whereby said plate is adjustable relative to said bracket.

2. A kickstand of claim 1, wherein said bracket includes an extension, said slot is formed in said extension.

3. The kickstand of claim 2, wherein said extension includes a pair of ribs, said plate is slidably engaged between said ribs.

4. The kickstand of claim 1, wherein said bracket includes a board fixed thereto so as to fix said bracket to a chain stay of said bicycle.

5. The kickstand of claim 1, wherein said bracket includes a space formed therein, and a foot post is pivotally coupled in said space of said bracket.

* * * * *